June 13, 1961  G. AGINS ET AL  2,988,685
ELECTRO-MECHANICAL FEEDBACK CONTROL SYSTEM
Filed April 29, 1942  3 Sheets-Sheet 1

INVENTORS
GEORGE AGINS
CHARLES D. BOCK
RICHARD Y. MINER
BY
Hoguet, Neary & Campbell
ATTORNEYS United States Patent Office 2,988,685
Patented June 13, 1961

2,988,685
ELECTRO-MECHANICAL FEEDBACK CONTROL SYSTEM
George Agins, Brooklyn, and Charles D. Bock and Richard Y. Miner, New York, N.Y., assignors to American Bosch Arma Corporation
Filed Apr. 29, 1942, Ser. No. 440,958
14 Claims. (Cl. 318—448)

This invention relates to electro-mechanical control systems and has particular reference to velocity damping means for such systems operable to automatically control the damping of the movements of a controlled element, so that a decreasing damping effect is provided for an increasing angular lag or deviation in the response of the controlled element to its order, and conversely, an increasing damping effect is provided for a decreasing angular lag or deviation.

The electro-mechanical control system of this invention comprises means including a portable element adapted to receive control potentials and combine them into a resultant potential representable by the angular position to which said element is moved by the effect of such potentials. The damping means of the system operates to damp the movement of the rotatable element in response to changes in the resultant potential, and this damping effect is of inverse proportion to the angular lag of the movement of the element to the deviations produced in the resultant potential by changes in the control potentials. In other words, a greater degree of damping is effected for small deviations without including the undesirable effects of extremely heavy damping for large deviations. In general, extremely heavy damping for large deviations is undesirable because of the length of time required to reduce the deviation to zero in a highly overdamped system. The inverse damping feature of this invention overcomes this disadvantage and results in rapid and smooth synchronizing operation between the controlling portion of the system and the element, the angular position of which is controlled thereby.

More particularly the electro-mechanical control system of this invention comprises rotor and stator members each having two windings arranged in space quadrature, and inputs for energizing the stator windings by signal or other variable potentials. A motor is electrically connected to one of said rotor windings and the armature thereof is connected to the rotor to control the angular position thereof according to the resultant voltage induced in such rotor winding. This movement of the rotor to a new angular position reduces to zero the induced voltage and thereby deenergizes the motor. The resultant voltage induced in the other rotor winding in this position of the rotor is a trigonometric function of the magnitudes of the variable potentials applied to the two stator windings.

For rapid and smooth synchronizing between the rotor and the applied poetntials, means are provided in the system for damping the movement of the rotor. The damping means comprises a generator driven by the aforementioned motor, and a suppressor circuit is provided to control said damping means. This, as hereinafter described in detail, imposes a heavy damping effect on the motor circuit for small deviations and a decreasing damping effect for increasing deviations.

In addition, a compensating voltage may be introduced into the damping circuit in series opposition to the voltage produced by the generator to introduce a compensating effect, the magnitude of which is determined by the mechanical movement of other equipment which may be associated with or included as a part of the system.

For a more complete understanding of the invention, reference may be had to the following detailed description to be read in connection with the accompanying drawings, in which.

Figure 1:
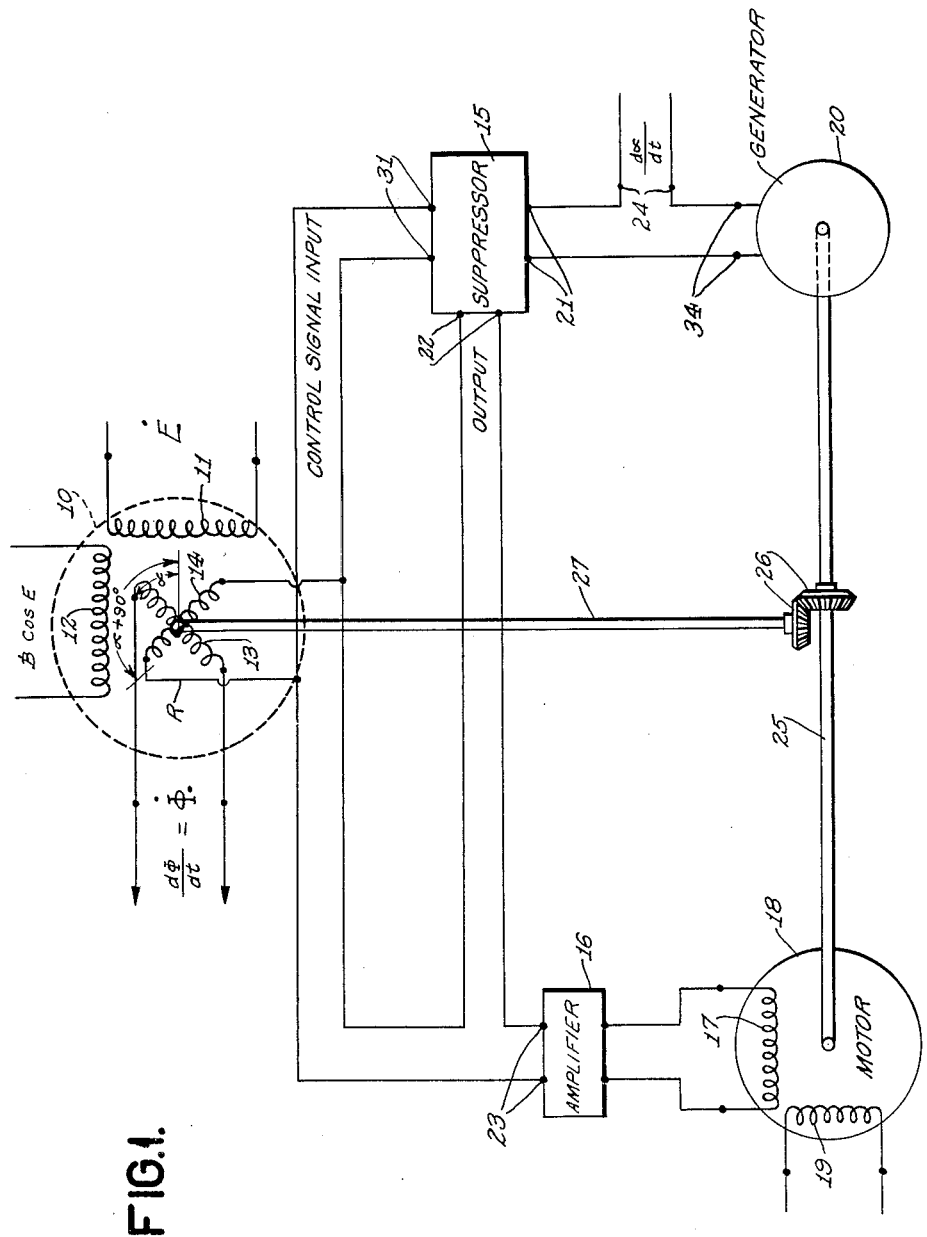
FIGURE 1 is a schematic diagram of an electromechanical control system in accordance with this invention.

Referring to FIG. 1 of the drawings, the electro-mechanical control system of this invention may include an induction regulator or electric resolver 10, an amplifier 16 which may be of any suitable high gain type and a two phase induction motor 18, such as illustrated and described in copending application Serial No. 346,183, filed July 18, 1940, now abandoned.

The electric resolver 10 comprises a stator having wings 11 and 12 which are arranged in space quadrature, and a rotor R having windings 13 and 14 which are also in space quadrature. The rotor R is operatively connected by shafts 25 and 27 and gears 26 to the armature of the motor 18. Connected to the shaft 25 is a generator 20, the output terminals 34 of which are connected in series opposition with a pair of input compensating voltage terminals 24 and in series with a pair of input terminals 21 of a suppressor 15. The suppressor circuit (FIG. 2) hereinafter described has a pair of control signal input terminals 31 which are connected across the null winding 14 of the rotor R, and a pair of output terminals 22 connected in series with the terminals 23 of the amplifier 16 and in series opposition with the winding 14.

Disregarding for the moment the damping effect of the generator 20 and the suppressor 15, the energization of stator windings 11 and 12 of the resolver 10 by respective electrical inputs $y$ and $x$, which are in time phase, induces voltages in the rotor null winding 14, the resultant of which is amplified by the amplifier 16 and impressed on the winding 17 of the two-phase motor 18, the second winding 19 of which is energized by a constant alternating current source.

The motor 18 operates to drive the rotor R of the resolver 10 in a direction to reduce to zero the resultant voltage induced in the null winding 14. When the voltage of the winding 14 reaches zero the motor winding 17 becomes deenergized, and the motor 18 comes to rest with the rotor R of the resolver displaced to a position where the angular displacement of the rotor winding with respect to the stator windings is the angle whose tangent is $y/x$.

Rapid and smooth synchronizing of the operation of the motor 18 to variable unsteady voltages induced in the rotor winding 14 is effected by the influence of the compensating velocity damping voltages imposed upon the system by the circuit of the suppressor 15.

Figure 2:
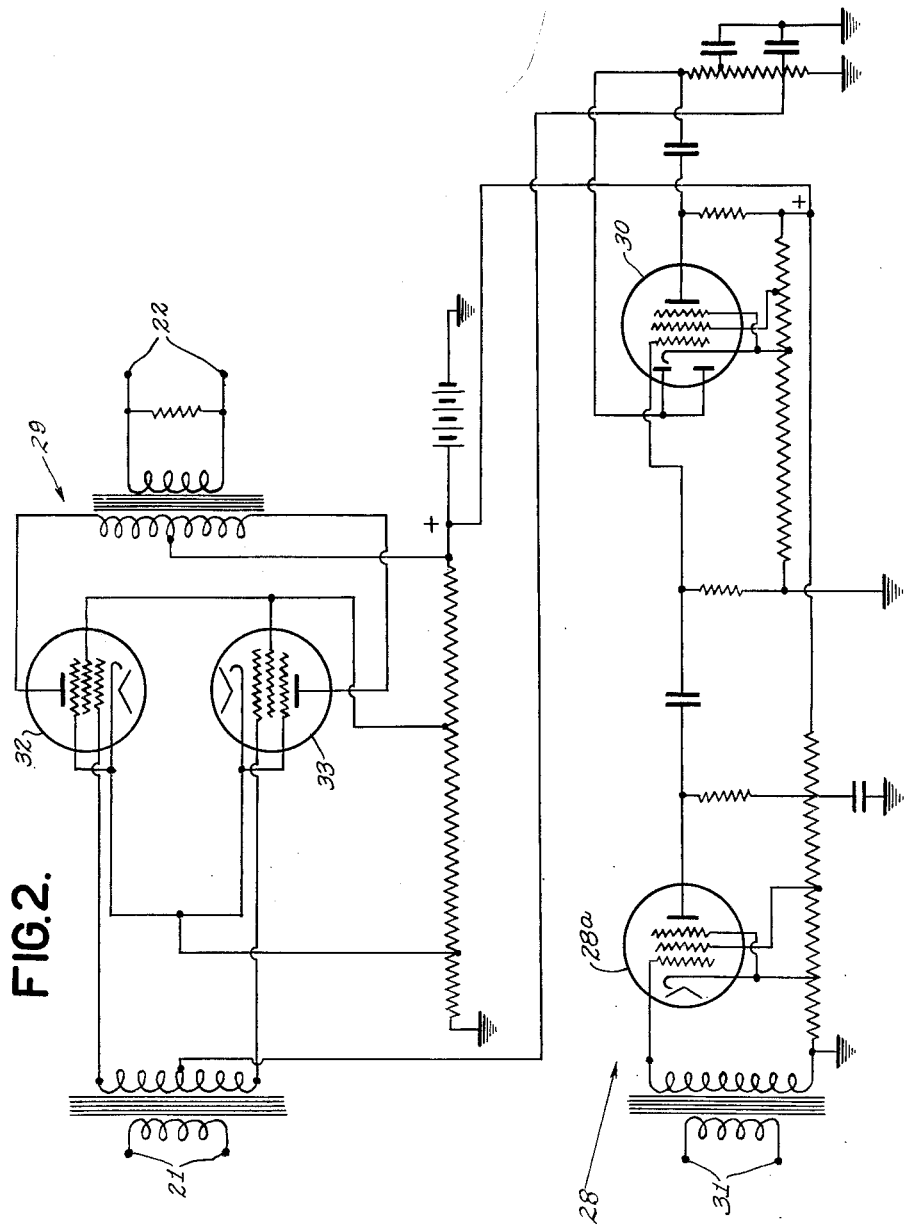
FIG. 2 is a schematic diagram of a suppressor circuit of the system.

Referring to FIG. 2 of the drawings, the suppressor 15 is shown to include two voltage amplifiers 28, 29 and one rectifier 30. The control signal voltage is the deviation voltage induced in the winding 14 and is impressed on input terminals 31 of the suppressor to be amplified by amplifier 28 which includes a pentode 28a. The output voltage of the amplifier 28 is rectified by the rectifier 30. The output voltage of the rectifier 30 is applied to the grids of the tubes of amplifier 29 as the bias voltage. Amplifier 29 amplifies the voltage impressed on the input terminals 21, which voltage is the sum of the output voltage of generator 20 and the compensating voltage received through the terminals 24. Amplifier 29 contains two pentodes 32 and 33 that have remote cut-off characteristics and are used to obtain smooth operation over a wide range of grid bias voltage. The two pentodes 32 and 33 are operated in push-pull to remove harmonics.

An increase in the deviation voltage causes the grid bias voltage of amplifier 29 to become more negative, thereby decreasing the plate current flow in the pentodes 32 and 33. This results in less output voltage for the amplifier 29. Thus, with an increase in the deviation voltage, a corresponding proportional decrease in the output voltage of the amplifier 29 will result. Since the output voltage of the suppressor imposes a damping factor on the deviation voltage induced in the winding 14, there will be a corresponding proportional decrease in the damping effect for increases in the deviation voltage.

Now, since the damping effect decreases with an increase in the deviation voltage, the speed of the motor 18 is increased at proportionally higher rates for increases in the deviation voltage. Therefore, the rotor R of the resolver will be driven to the zero deviation position in less time than it would if the suppressor were not in the circuit.

The control signal voltage, which is the deviation voltage is reduced as the rotor R of the resolver approaches the zero deviation position. The reduction of the deviation voltage causes the grid bias voltage of amplifier 29 to become less negative, thereby increasing the output voltage of the amplifier 29 and causing the system to become more damped. Thus, the speed of the motor 18 is decreased at proportionally lower rates for decreases in the deviation voltage.

Figure 3:
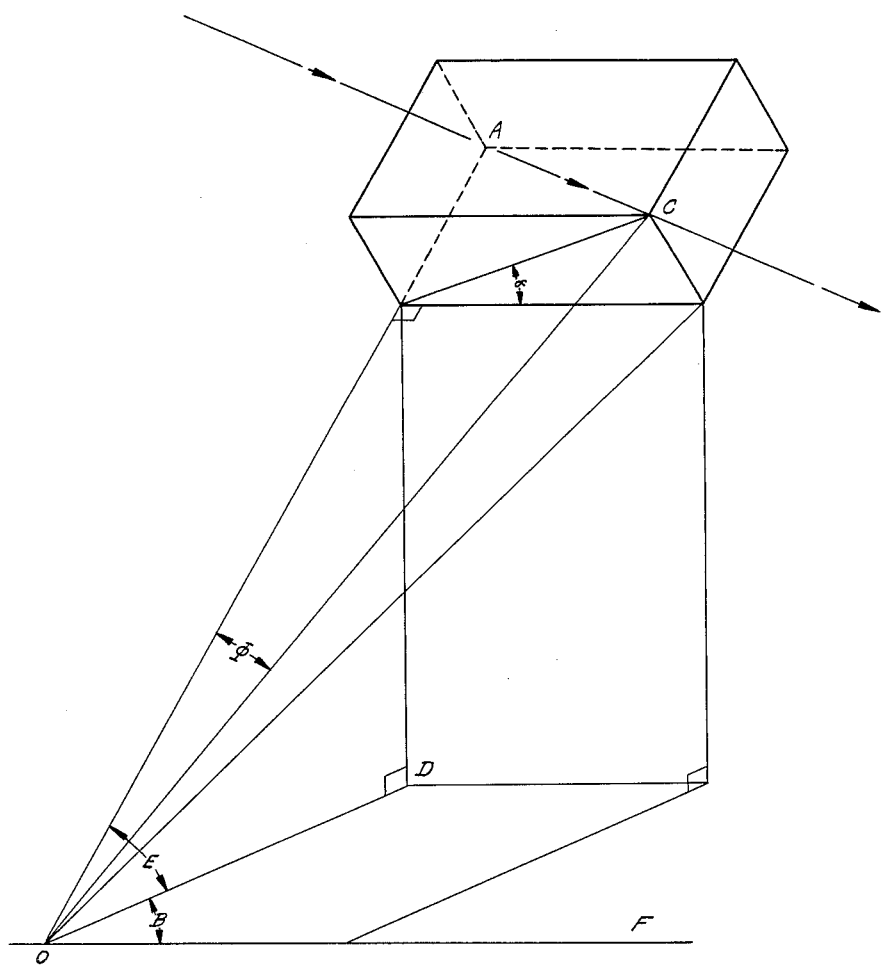
FIG. 3 is a geometrical diagram of the gun fire control problem.

To illustrate a practical use of the invention, FIG. 3 shows a geometrical diagram of a gun fire control problem in which O represents the observation instrument, OA represents the line of sight to the aerial target, and AC represents the line of flight of the target. B, the angular bearing of the target, is measured in a horizontal plane, and is the angle between the horizontal projection OD of the line of sight and the zero bearing line OF. E, the angle of target elevation, is measured between the line of sight OA and its horizontal projection OD. Φ represents the angular displacement of the target and is measured in a slanting plane between the line of sight OA and the line OC.

The voltage input on the primary winding 11 of the resolver 10 is proportional to the rate of change of target elevation $\dot{E}$. The voltage input on primary winding 12 of the resolver is proportional to $\dot{B}$ cos $E$, the rate of change of bearing of the target measured in a plane that contains the line of sight and in which all horizontal lines are perpendicular to the line of sight. The resolver composes $\dot{E}$ and $\dot{B}$ cos $E$ into a resultant voltage which is proportional to $\dot{\Phi}$ the angular velocity of the target measured in a slant plane which contains the line of sight and the line of flight of the target.

The angular displacement of the rotor of the resolver from its zero position is the angle α. Angle α is measured in a plane perpendicular to the line of sight OA and is the angle between the plane which contains the line of sight and in which all horizontal lines are perpendicular to the line of sight, and the slant plane that contains the line of sight and the line of flight AC of the target.

Any change in $\dot{E}$ and $\dot{B}$ cos $E$ produces a proportional change in the voltages induced in secondary windings 13 and 14 of the resolver 10. The sum of the resultant voltage in the null winding 14 of the resolver and the output voltage of the suppressor 15 comprises the input voltage of the amplifier 16. The output voltage of the amplifier 16 is impressed on the winding 17 of the two-phase induction motor 18. The windings 17 and 19 of the motor 18 are in space quadrature and the voltages applied to them differ in time phase.

The voltage impressed on the input terminals 21 of the suppressor 15 is made up of the output voltage of the alternating current generator 20, added in series opposition with an alternating current compensating voltage received through the terminals 24. This compensating voltage is proportional to $$\frac{d\alpha}{dt}$$

and is obtained electrically from the mechanical movement of the training gears of the director, and the elevating gears of the optical system, as is illustrated and described in copending application Serial No. 531,562, filed April 18, 1944.

The output voltage of the generator 20 provides velocity damping for the motor 18. A voltage, which is proportional to $$\frac{d\alpha}{dt}$$

is added in series opposition with the output voltage of the generator 20 to prevent the generator from introducing a velocity lag in the position of the rotor of the resolver. The induction motor 18 usually runs at a very low speed, which means a very high slip. Since the load on the motor is never zero and it runs at a very low speed, the speed of the motor is a function of the voltage impressed on its windings. Consequently, the speed of the motor varies as the output voltage of the amplifier 16 varies. The change in speed of the motor is such as to drive the rotor of the resolver 10 to the correct value of α. When the correct value of α is obtained, the resultant of the voltages induced in the null winding 14 of the resolver 10 is substantially zero. In effect the motor in running tends always to reduce to zero the resultant of the voltages induced in null winding 14 of the resolver 10.

A sudden large increase in the deviation causes a sudden increase in the resultant voltage induced in the null winding 14 of the resolver 10. This increases the speed of the motor 18 and in turn increases the output voltage of the generator 20. The increased damping voltage, if uncontrolled, would restrain the positioning of the rotor of the resolver to such an extent that the time required to reduce the deviation to zero would increase to an interval too large for practical consideration.

The suppressor 15 is provided to decrease the time required for the motor to drive the rotor of the resolver to the correct value of α and continue to follow α. The action of the suppressor is such as to decrease the damping effect when the deviation becomes great enough to cause the generator to produce a large voltage, and to increase the damping effect as the deviation becomes smaller. This causes the system to become more stable and reduces the time required for the motor to drive the rotor of the resolver to the correct value of α.

The proper value of α is continuously solved by the $$\frac{d\alpha}{dt}$$

voltage applied at the terminals 24 even in the absence of the deviation or null winding 14 voltage. Thus the combination of the $$\frac{d\alpha}{dt}$$

voltage and the generator 20 voltage gives a value of α by the relation $$\alpha = \int_a^b \frac{d\alpha}{dt} + K$$

The value of K is obtained as a long time average of the voltage values of the null winding 14 of the resolver which at times may be very unsteady. This system permits a steady following of a very unsteady signal, while including rapid synchronizing to the correct value.

While one embodiment only has been shown and described it is recognized that other embodiments of the invention and variations of the embodiment disclosed may be made without departing from the invention. It will

We claim:

1. An electro-mechanical control system comprising means for supplying control potentials, means including a rotatable element adapted to receive said control potentials and combine them into a resultant potential representable by the angular position to which said element is to be moved from a given position by the resultant force of said control potentials, driving means responsive to variations in the said resultant potential for moving said element, and means for supplying potentials to said driving means for damping the movement of said element in response to changes in said resultant potential, said damping potentials being of inverse proportion to the angular lag of the movement of said element to deviations produced in said resultant potential by changes in the control potentials.

2. An electro-mechanical control system comprising means for supplying control potentials, means including a rotatable element adapted to receive control potentials and combine them into a resultant potential representable by the angular position to which said element is moved from a given position by the resultant force of said control potentials, driving means responsive to said resultant potential for rotating said element, means for supplying potentials to said driving means for damping the movement of said element in response to changes in said resultant potential, said damping potentials being of inverse proportion to the angular lag of the movement of said element to deviations produced in said resultant potential by changes in said control potentials, and means for introducing a compensating voltage in opposition to the damping potentials to minimize velocity lag in the movement of said element caused by the load thereon of other parts of the system.

3. An electro-mechanical control system comprising means for supplying control potentials, means including a rotatable element adapted to receive control potentials and combine them into a resultant potential representable by the angular position to which said element is moved from a given position by the resultant force of said control potentials, driving means responsive to said resultant potential for rotating said element, an amplifier connected to said element and to said driving means, and a rectifier connected to said element and said amplifier to produce from said resultant voltage a grid bias voltage for said amplifier for varying the output voltage of said amplifier to impose upon the driving means a damping factor inversely proportional to changes in said resultant potential.

4. An electro-mechanical control system comprising a movable element, driving means for moving said element angularly, means including primary and secondary transformer windings by which control potentials can be combined to control said driving means and determine the angular position of said element, and means for damping the movement of said element from one position to another in inverse proportion to the angular lag of said element to the force of said control potentials.

5. An electro-mechanical control system comprising a movable element, means including primary and secondary transformer windings by which control potentials can be supplied and combined to determine the angular position of said element, driving means responsive to said combined potential for moving said element angularly, an amplifier connected in series opposition to said element and connected to said driving means, and a rectifier connected to said element and to said amplifier to produce from said combined potentials a grid bias voltage for said amplifier for varying the output voltage of said amplifier to impose upon said driving means a damping factor inversely proportional to changes in said combined potentials.

6. An electro-mechanical control system comprising a movable element, means including motive means and primary and secondary transformer windings by which control potentials can be supplied and combined to actuate said motive means to determine the angular position of said element, means driven by said motive means in accordance with deviations produced in the voltage induced in said secondary winding to generate a damping voltage, and means to decrease said damping voltage as the deviations increase.

7. An electro-mechanical control system comprising a movable element, means including motive means and primary and secondary transformer windings by which control potentials can be supplied and combined to provide a resultant voltage for actuating said motive means to determine the angular position of said element, means driven by said motive means in accordance with deviations produced in the voltage induced in said secondary winding to generate a damping voltage, means having an amplifier to control the damping voltage, the outfit of which is connected to said motive means, and a rectifier connected to said secondary winding to produce from said resultant voltage a grid bias voltage for said amplifier to vary the damping voltage inversely proportional to changes in said resultant voltage.

8. An electro-mechanical control system comprising a movable element, means including primary and secondary transformer windings by which control potentials can be supplied and combined to provide a resultant voltage to determine the angular position of said element, driving means responsive to said resultant voltage for moving said element, means for damping the movement of said element in inverse proportion to the annular lag of said element to the force of said control potentials, and means for introducing a compensating voltage in opposition to the damping effect to minimize velocity lag in the movement of said element.

9. An electro-mechanical control system comprising a stator having two windings in space quadrature, a rotor having at least one winding, means to energize the stator windings by variable potentials, motive means electrically connected to the rotor winding and mechanically connected to said rotor to drive the rotor to an angular position such that the induced voltage is reduced to zero, and means for damping the movement of said rotor, said damping being of inverse proportion to the angular lag of said rotor to the resultant force of said potentials.

10. An electro-mechanical control system comprising rotor and stator members each having two windings in space quadrature, the windings of one of said members being energizable by variable potentials, motive means electrically connected to one of the windings of the other of said members and mechanically connected to said rotor, said motive means being adapted to drive the rotor to an angular position such that the induced voltage in said one of the windings is reduced to zero, the voltage induced in the other winding of said other of said members at such position of the rotor being a trigonometric function of the magnitudes of the variable potentials and the angular position of such winding, and means for damping the movement of said rotor, said damping being of inverse proportion to the angular lag of said rotor to the resultant force of said potentials.

11. An electro-mechanical control system comprising a stator having two windings in space quadrature, a rotor having at least one winding, means to energize the stator windings by variable potentials, motive means electrically connected to the rotor windings, a generator, said motive means being mechanically connected to said rotor and said generator and operable to drive them when energized by voltages induced in the rotor winding until an angular position of the rotor is reached where the induced voltage is reduced to zero, means connected to the output of said generator and in series opposition to the rotor winding for damping the movement of said rotor in inverse proportion to the angular lag of said rotor to the induced voltage.

12. An electro-mechanical control system comprising a stator having two windings in space quadrature, a rotor having at least one winding means to energize the stator windings by variable potentials, motive means electrically connected to the rotor windings, a generator, said motive means being mechanically connected to said rotor and said generator and operable to drive them when energized by voltages induced in the rotor winding until an angular position of the rotor is reached where the induced voltage is reduced to zero, an amplifier for the output current of said generator connected in series opposition to the rotor winding, and means responsive to said induced voltage to control said amplifier to impose upon the system a damping factor inversely proportional to changes in said resultant potentials.

13. An electro-mechanical control system comprising stator and rotor members having primary and secondary transformer windings respectively, said primary winding being adapted to receive control potentials and thereby induce voltages in said secondary winding, motive means connected to said secondary winding and responsive to voltages induced in said secondary winding to move said rotor to an angular position corresponding to the resultant force of said control potentials, and a suppressor circuit for said motive means having an amplifier, and a rectifier connected to said secondary winding for supplying to said amplifier a grid bias voltage in proportion to the voltage induced in the secondary winding so as to impose a damping effect upon the movement of said element in inverse proportion to the angular lag of said element to the force of said control potentials.

14. An electro-mechanical control system comprising stator and rotor members having primary and secondary transformer windings respectively, motive means connected to said secondary winding and responsive to voltages induced in said secondary winding from control potentials applied to said primary winding to move said rotor to an angular position corresponding to the resultant force of said control potentials, and a suppressor circuit to impose a damping effect upon the movement of said element in inverse proportion to the angular lag of said element to the force of said control potentials, said suppressor circuit having an input connection to receive a velocity compensating voltage, an amplifier for said compensating voltage, a rectifier connected to said rotor winding and responsive to voltages induced in the rotor winding to provide a grid bias voltage for said amplifier proportional to the magnitude of said induced voltage, and said amplifier having an outlet for connection in series opposition to said secondary winding.

References Cited in the file of this patent
UNITED STATES PATENTS

| | | |
|---|---|---|
| 2,171,614 | Wendt | Sept. 5, 1939 |
| 2,280,019 | Alexandersson | Apr. 14, 1942 |